US010683841B2

(12) United States Patent
Farrant

(10) Patent No.: US 10,683,841 B2
(45) Date of Patent: Jun. 16, 2020

(54) CLOSED LOOP MULTIPLE AIRFOIL WIND TURBINE

(71) Applicant: Harvard M. Farrant, Sudbury (CA)

(72) Inventor: Harvard M. Farrant, Sudbury (CA)

( * ) Notice: Subject to any disclaimer, the term of this patent is extended or adjusted under 35 U.S.C. 154(b) by 88 days.

(21) Appl. No.: 15/562,797

(22) PCT Filed: Mar. 31, 2016

(86) PCT No.: PCT/CA2016/050375
§ 371 (c)(1),
(2) Date: Sep. 28, 2017

(87) PCT Pub. No.: WO2016/154757
PCT Pub. Date: Oct. 6, 2016

(65) Prior Publication Data
US 2018/0283350 A1  Oct. 4, 2018

(30) Foreign Application Priority Data
Mar. 31, 2015  (CA) ...................................... 2886731

(51) Int. Cl.
*F03D 5/04* (2006.01)
*F03D 5/02* (2006.01)

(52) U.S. Cl.
CPC .................. *F03D 5/02* (2013.01); *F03D 5/04* (2013.01); *F05B 2220/706* (2013.01);
(Continued)

(58) Field of Classification Search
CPC ...... F03B 17/06; F03B 17/064; F03B 17/066; F03D 5/02; F03D 5/04
See application file for complete search history.

(56) References Cited

U.S. PATENT DOCUMENTS 4,049,300 A * 9/1977 Schneider ................ F03D 3/04
290/54
4,494,008 A * 1/1985 Patton .................... F01D 23/00
290/44
(Continued)

FOREIGN PATENT DOCUMENTS

CA       2522280 A1   10/2004
CN     201250758 Y    6/2009
(Continued)

OTHER PUBLICATIONS

International Search Report and Written Opinion, dated Jun. 14, 2016, PCT application No. PCT/CA2016/050375, pp. 8.
(Continued)

*Primary Examiner* — Kenneth J Hansen
*Assistant Examiner* — Andrew J Marien

(57) ABSTRACT

Disclosed is a multiple blade wind turbine (MBWT). The MBWT includes: at least one rotor comprising two closed loop tracks positioned parallel or equidistant to one another and a plurality of airfoils interspaced within the tracks. The plurality of airfoils are connected at each end to one of said tracks and are fully rotatable with respect to said closed loop tracks. A transmission is connected to one of the tracks. The track drives the transmission and an electric generator is connected to said transmission for generating electricity. The rotors are oriented vertically or horizontally with respect to a vertical support structure that is used to support the rotors. The MBWT's design allows the electric generator(s) and transmission system to be housed relatively close to ground level. This configuration reduces the mass of the central support tower and reduces the construction and ongoing maintenance costs.

18 Claims, 12 Drawing Sheets

(52) U.S. Cl.
CPC ... *F05B 2240/231* (2013.01); *F05B 2240/912* (2013.01); *F05B 2250/14* (2013.01); *Y02E 10/70* (2013.01); *Y02E 10/725* (2013.01); *Y02E 10/728* (2013.01)

(56) References Cited

U.S. PATENT DOCUMENTS

| | | | |
|---|---|---|---|
| 4,589,334 A | | 5/1986 | Davison |
| 4,589,344 A * | | 5/1986 | Davison ............... F03D 5/04 |
| | | | 104/118 |
| 4,756,666 A | | 7/1988 | Labrador |
| 4,859,146 A * | | 8/1989 | Labrador ............. F03D 5/04 |
| | | | 416/8 |
| 4,930,985 A * | | 6/1990 | Klute .................. F03D 5/02 |
| | | | 415/5 |
| 8,618,682 B2 * | | 12/2013 | Syrovy ................ F03D 5/02 |
| | | | 290/44 |
| 2006/0192389 A1 * | | 8/2006 | Perry .................. F03B 17/066 |
| | | | 290/43 |
| 2007/0297902 A1 | | 12/2007 | Jonsson |
| 2009/0096216 A1 * | | 4/2009 | Power, III ........... F03D 5/04 |
| | | | 290/54 |
| 2010/0266407 A1 | | 10/2010 | Barber |
| 2010/0289264 A1 * | | 11/2010 | Lee ..................... F03B 17/068 |
| | | | 290/44 |
| 2011/0115231 A1 * | | 5/2011 | Mulye ................. F03B 17/064 |
| | | | 290/54 |
| 2011/0309634 A1 * | | 12/2011 | Syrovy ................ F03D 5/02 |
| | | | 290/55 |
| 2015/0159620 A1 * | | 6/2015 | Widmer ............... F03B 17/063 |
| | | | 290/54 |

FOREIGN PATENT DOCUMENTS

| | | |
|---|---|---|
| CN | 101892949 A | 11/2010 |
| WO | WO-2009/101596 A2 | 8/2009 |
| WO | WO-2010/030895 A2 | 3/2010 |
| WO | WO-2010/102005 A2 | 9/2010 |
| WO | WO-2014/006608 A1 | 1/2014 |

OTHER PUBLICATIONS

Written Opinion dated Jun. 14, 2016, for PCT Application No. PCT/CA2016/050375, filed Mar. 31, 2016, 6 pages.

* cited by examiner

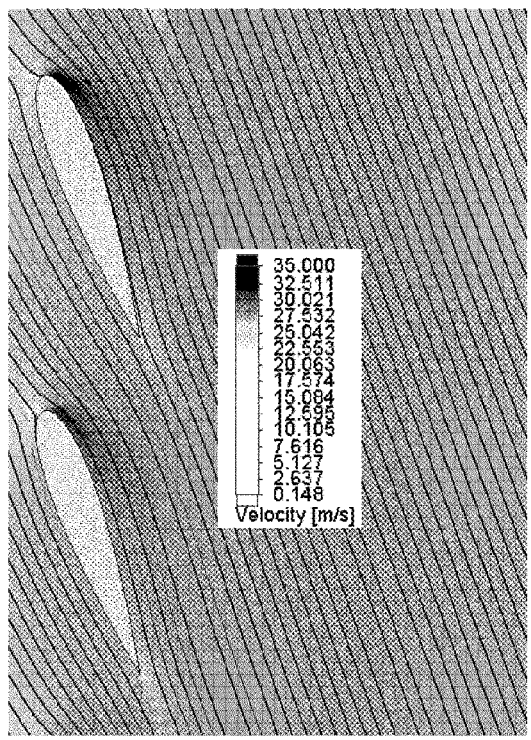 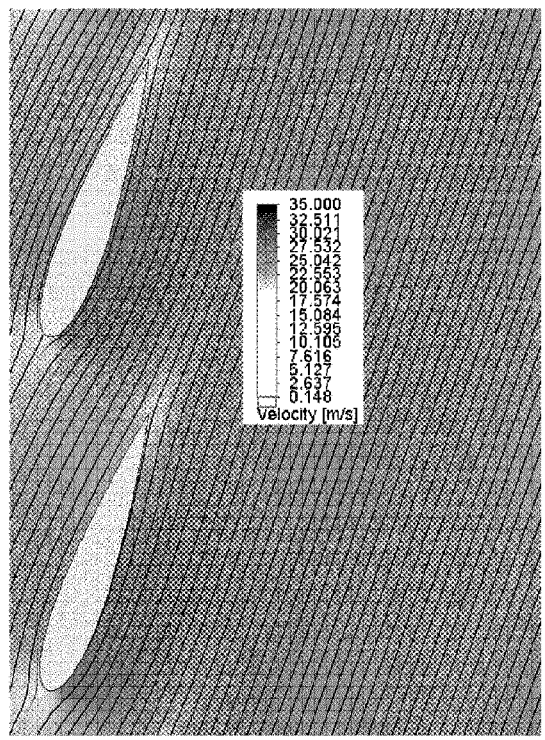
(a) (b)
FIGURE 8a & 8b
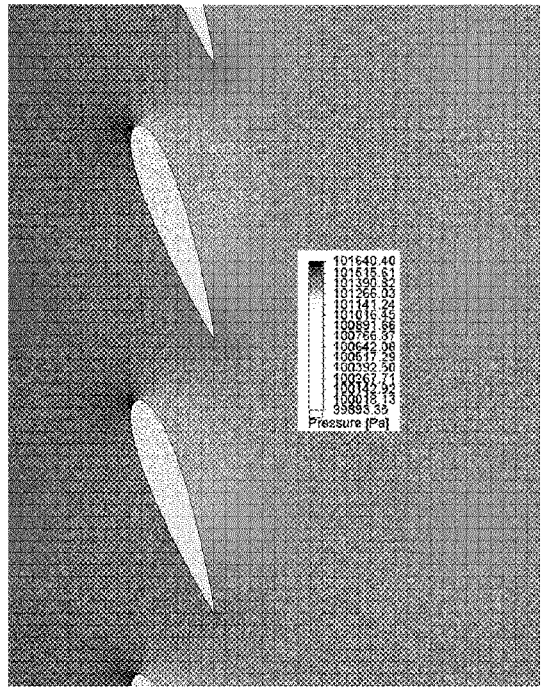 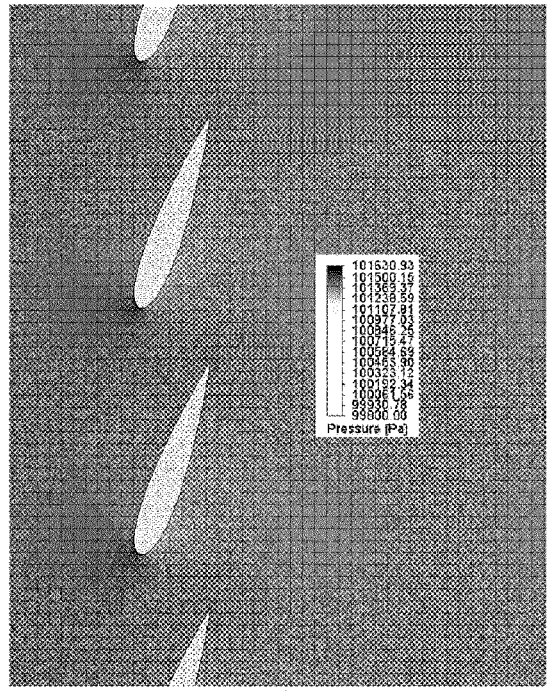
(a) (b)
FIGURE 9a & 9b

CLOSED LOOP MULTIPLE AIRFOIL WIND TURBINE

RELATED APPLICATIONS

This application is the national stage filing under USC 371 of international application PCT/CA2016/0050375 filed on Mar. 31, 2016, which claims priority to Canadian Application No. 2886731 filed Mar. 31, 2015, the disclosures of which are incorporated by reference herein in their entirety.

FIELD OF THE INVENTION

The present invention generally relates to wind energy technology. More specifically, the invention relates to a multiple blade wind turbine.

BACKGROUND OF THE INVENTION

Wind turbines are an important technology for the generation of electricity using renewable energy resources, i.e. the wind. Their annual percentage increase in kilowatt production is currently greater than any other form of electricity-generating technology.

Presently, the most popular type of large wind turbine, i.e. greater than 25 kW (rated peak power), has a horizontal axis, referred to as a horizontal axis wind turbine (HAWT), and can have one or more high-speed, airfoil-type rotor blades used for generating lift. Wind turbines are either of variable-speed or fixed-speed type.

The kinetic energy of the wind can be expressed as: $KE_{wind} = \frac{1}{2}mV^2 = \frac{1}{2}(\rho AtV)V^2 = \frac{1}{2}\rho AtV^3$ where m is the mass of air, $\rho$ is the air density, A is the area swept by the wind turbine blades, t is the time, and V is the wind speed. Therefore, the power (i.e. energy/time) of the wind can be expressed as: $POWER_{wind} = \frac{1}{2}\rho AV^3$. As we can see, the wind's power is directly related to the wind speed cubed. For example, when the wind speed doubles, its power is increased by a factor of eight (i.e. $2^3=8$).

The power harnessed by a wind turbine is directly related to the power of the wind that passes through the area swept by the wind turbine blades.

Multiple blade wind turbines have already been previously considered. For example, U.S. Pat. No. 8,618,682 describes a looped airfoil wind turbine (LAWT) and is shown in FIGS. 1a and 1b. The LAWT is based on a conveyor-belt arrangement of horizontal airfoils. U.S. Pat. No. 7,075,191 describes a wind and water power generation device (WWPGD) using a rail system and is shown in FIG. 2. The WWPGD is based on a conveyor-belt arrangement of vertically-mounted airfoils.

U.S. Pat. No. 4,049,300 describes a fluid driven power producing apparatus (FDPPA) and is shown in FIG. 3. The FDPPA is based on a conveyor-belt arrangement of horizontally-mounted airfoils.

SUMMARY OF THE INVENTION

According to an aspect of the present invention there is provided a multiple blade wind turbine comprising at least one rotor comprising two closed loop tracks positioned parallel or equidistant to one another and a plurality of airfoils interspaced within the tracks. The plurality of airfoils are connected at each end to one of said tracks and are fully rotatable with respect to said closed loop tracks. A transmission is connected to one of the tracks. The track drives the transmission and an electric generator is connected to said transmission for generating electricity.

In one embodiment of the invention, the multiple blade wind turbine further comprises a support structure for maintaining the rotor in a fixed orientation with respect to the support structure.

In another embodiment of the invention, the rotor is maintained parallel or perpendicular to the support structure.

In a further embodiment of the invention, the rotor is rotatable about the longitudinal axis of the support structure.

In a still further embodiment of the invention, two rotors are positioned approximately 180 degrees apart about the support structure.

In another embodiment of the invention, the airfoils are symmetric or asymmetric.

In a yet further embodiment of the invention, the closed loop tracks are drive belts or drive chains.

In a still further embodiment, the airfoils are spaced 1.2 chord lengths apart, but other spacings between 0.3 and 6.0 chord lengths are also possible.

In yet another embodiment, a single rotor comprises two oval tracks with one track inside and concentric to the other, and these tracks are either in front of, or behind, the central support tower. The oval tracks can be either vertical or horizontal in orientation.

According to an aspect of the present invention, there is provided a multiple blade wind turbine comprising: a hub; a plurality of airfoils radially extending from the hub; and a ring joining each of said airfoils to maintain spacing between said airfoils.

In a further embodiment, the plurality of airfoils comprise 18 airfoils. However, the total number of airfoils could also typically range between 10 and 40 airfoils.

BRIEF DESCRIPTION OF THE DRAWINGS

These and other features, aspects and advantages of the present invention will become better understood with regard to the following description and accompanying drawings wherein:

FIG. 8a is a side view of an MBWT rotor's first column (windward) moving upwards using symmetrical NACA0016 airfoils in a CFD analysis showing velocity contours and stream lines;

FIG. 8b is a side view of an MBWT rotor's second column (leeward) moving downwards using NACA0016 airfoils in a CFD analysis showing velocity contours and stream lines;

FIG. 9a is a side view of an MBWT rotor's first column (windward) moving upwards using NACA0016 airfoils in a CFD analysis showing air pressure contours;

FIG. 9b is a side view of an MBWT rotor's second column (leeward) moving downwards using NACA0016 airfoils in a CFD analysis showing air pressure contours;

DESCRIPTION OF THE INVENTION

The following description is of one particular embodiment by way of example only and without limitation to the combination of features necessary for carrying the invention into effect.

Figure 5:
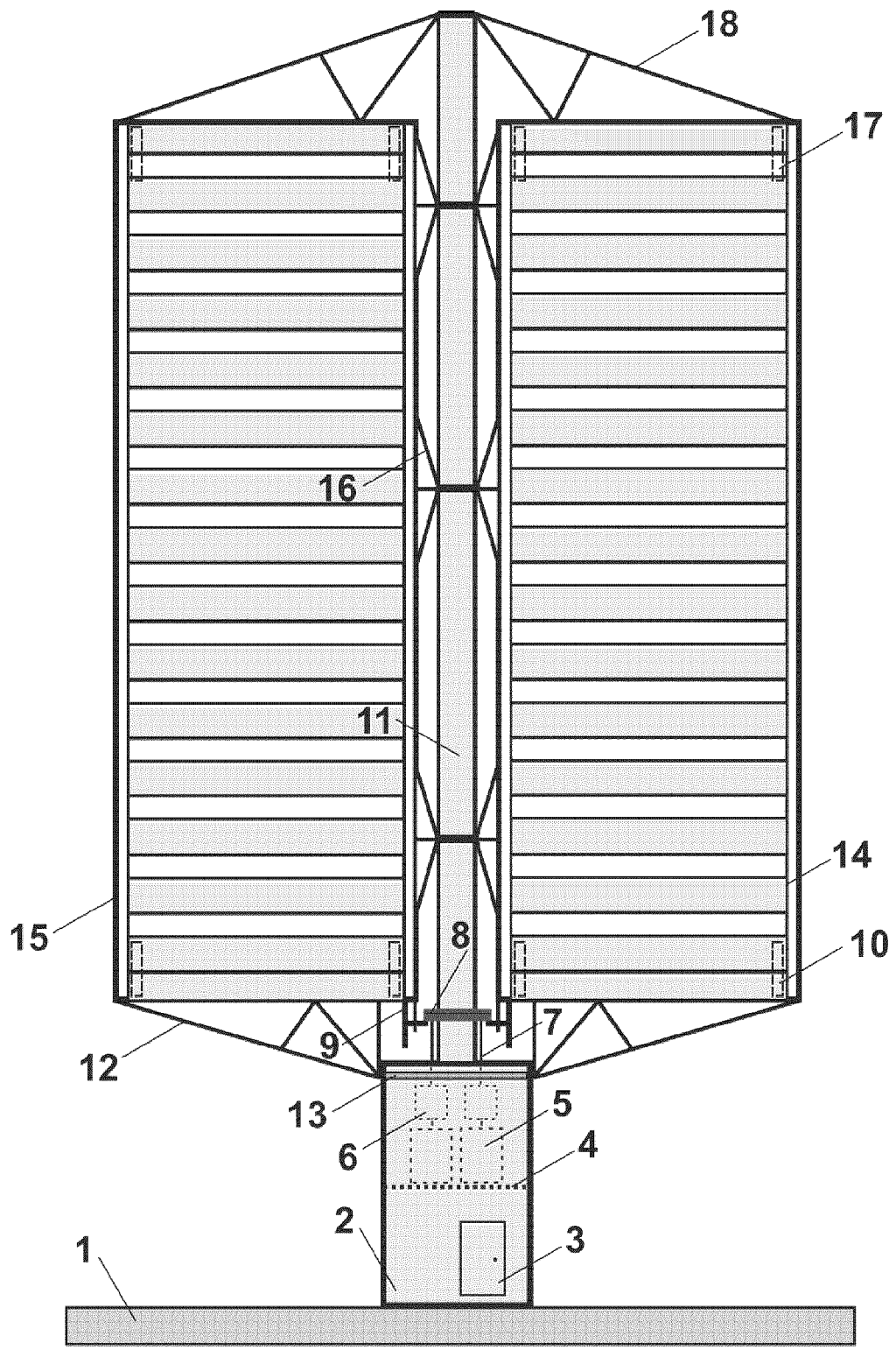
FIG. 5 is a front view of an MBWT system using vertically moving blades according to an embodiment of the present invention.

The multiple blade wind turbine (MBWT) has at least one rotor which is made up of two closed loop tracks positioned parallel to one another in either the same vertical column or horizontally in a row. Several airfoils or blades are interspaced within the tracks. In one embodiment, 64 airfoils are provided (FIG. 5). However, somewhat fewer or even far more airfoils, e.g., into the 100s, could be incorporated into a single MBWT. The end of each airfoil is connected to a closed loop track. The airfoils are connected to permit rotation of the airfoil relative to the tracks.

Another MBWT design variation incorporates a single rotor that comprises two oval tracks with one track inside and concentric to the other track, and these two tracks are either in front of, or behind, the central support tower. The oval tracks are either vertical or horizontal in orientation. Several airfoils or blades are interspaced within the tracks. The end of each airfoil is connected to an oval track. The airfoils are connected to permit rotation of the airfoil relative to the tracks. A transmission, which can be a gearbox, adjustable-speed drive, or continuously variable transmission, is connected to one of the tracks. The track engages the transmission to convert the low-speed rotation of the track to a high speed rotation capable of generating electricity. The transmission then engages an electric generator for generating the actual electricity.

A vertical central support tower is typically provided to support the rotor. Preferred arrangements include: a vertical conveyor-belt arrangement for the airfoils, or a horizontal conveyor-belt arrangement, both of which rely on the vertical central support tower to maintain the rotor's position relative to the support tower. The vertical central support tower can also house the electric generators and transmission system at the base of the central support tower.

It is preferred that two rotors are attached to the vertical central support and spaced approximately 180 degrees apart about the support structure and are rotatable about the vertical support structure to maximize contact with the wind.

Adjacent airfoils can be spaced less than one chord length apart or more than 1 chord length apart, for example 1.2 chord lengths apart. However a spacing of 0.3 to 6.0 chord lengths will also provide the desired results. Close-spacing of the blades increases the air pressure in front of the blades, which enables a greater drop in air pressure immediately behind the blades for additional lift. Moreover, close-spacing of the blades increases the air speed between the blades (due to the conservation of momentum), which also increases the lift force.

As mentioned above the airfoils can be rotated a full 360 degrees relative to the tracks. The blades can be oriented anywhere between 0 degrees and 95 degrees from horizontal to optimize power production. The linear speed of the rotor can exceed the wind speed to increase power production (i.e. a tip-speed ratio (TSR)>1) without stalling the blades.

A symmetrical airfoil, such as the NACA (National Advisory Committee for Aeronautics) 0016 airfoil (or a similar class of airfoils) is preferred, since it will maximize the lift for the leeward column of airfoils, but asymmetric airfoils, such as the NACA4412 or GOE (Gottingen) 531 airfoil, could be used, especially if they can be rotated and flipped during their descent in the leeward column to optimize down lift.

The tracks in the rotor can be direct chain drive or belt drive and the airfoil span to chord length ratio can be quite high, for example 10:1 to 20:1, because each airfoil is supported at both ends.

The present MBWT provides a measurable improvement in capturing power from the wind passing through a wind turbine blade's swept area.

The use of many identical, parallel (or nearly parallel) airfoils or blades that are closely-spaced contributes to the ability of the MBWT to capture power. The relatively small inter-blade distance, which would be typically less than two times (2×) the blade's chord length, ensures that the wind passing between the blades contributes directly to a blade's lifting force.

As the wind passes between two adjacent, closely-spaced blades its speed increases due to the conservation of momentum, which increases the lift force on each blade. This is due to the air's internal energy, U, being converted into kinetic energy, W. Moreover, as the wind passes between two adjacent blades it is redirected from the horizontal direction to a negatively-sloped direction. The vertical component of this redirection contributes to the blade's upward motion, according to Newton's third law of motion.

As the first column of blades moves upward they experience a relative wind that moves in a negatively-sloped direction. The shape, orientation and controlled vertical speed of the MBWT blades can ensure that the relative wind's negatively-sloped direction does not reduce the blade's Angle of Attack (AoA) to less than zero. This maximizes lift and reduces inter-blade air flow separation.

Since the Angle of Attack (AoA) of the relative wind does not exceed each blade's optimal orientation, the linear speed of the rotor can be increased, which directly increases the MBWT's power production. Therefore, a blade-to-windspeed ratio of 3 (i.e. the blade has a linear speed that is three times the wind speed), or even higher, is quite possible.

By using closely-spaced parallel (or nearly-parallel) airfoils, the power density of the MBWT is maximized in terms of kW/swept area ($m^2$).

As the wind passes through the second column of blades moving in the downward vertical direction, additional downward lift could be generated due to the orientation and slope of these blades. However, most of the power produced by the MBWT will be due to the lift generated by the first column of blades.

The total lift force generated by the multiple blades is transferred via the rotor's chain drive system to a power gear, which is linked by a gearbox, or hydraulic transmission, to an electric generator.

In one embodiment, the electric generator(s) and transmission mechanism are located near the ground permitting the use of a supporting tower that is considerably less massive and less expensive than a tower used for an industry-standard HAWT with the same peak power rating. In addition, the multiple blades would be light-weight and relatively inexpensive to mass produce.

Figures 1A, 1B:
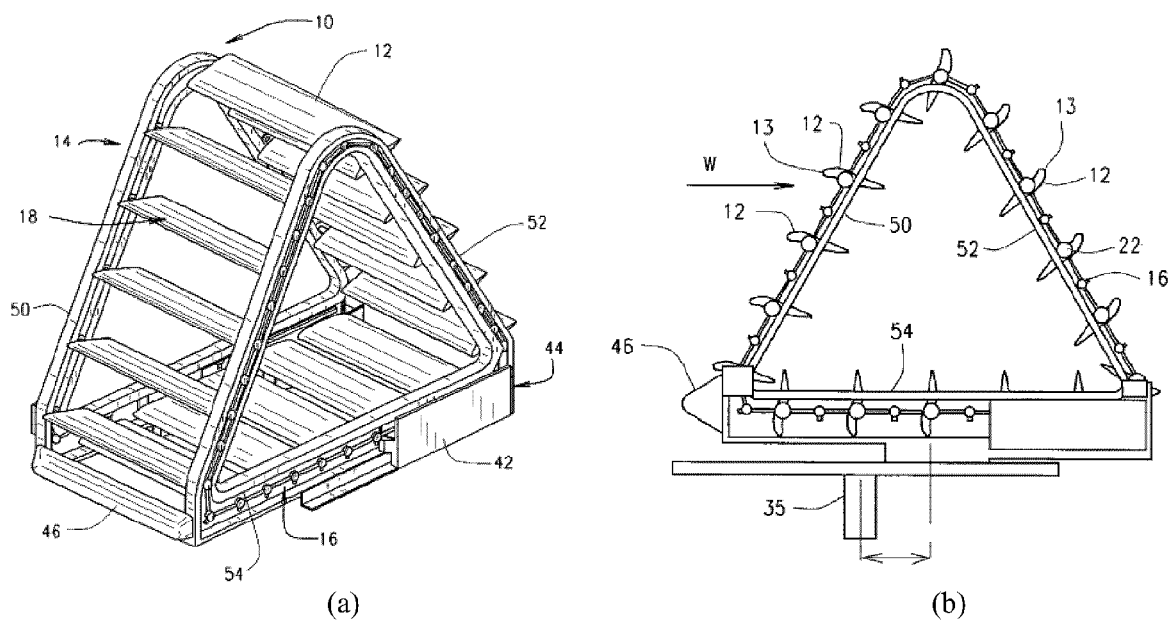
FIG. 1a is a 3-dimensional representation of a Looped Airfoil Wind Turbine (LAWT) of the prior art.
FIG. 1b is a 2-dimensional representation of a LAWT of the prior art.
Figure 2:
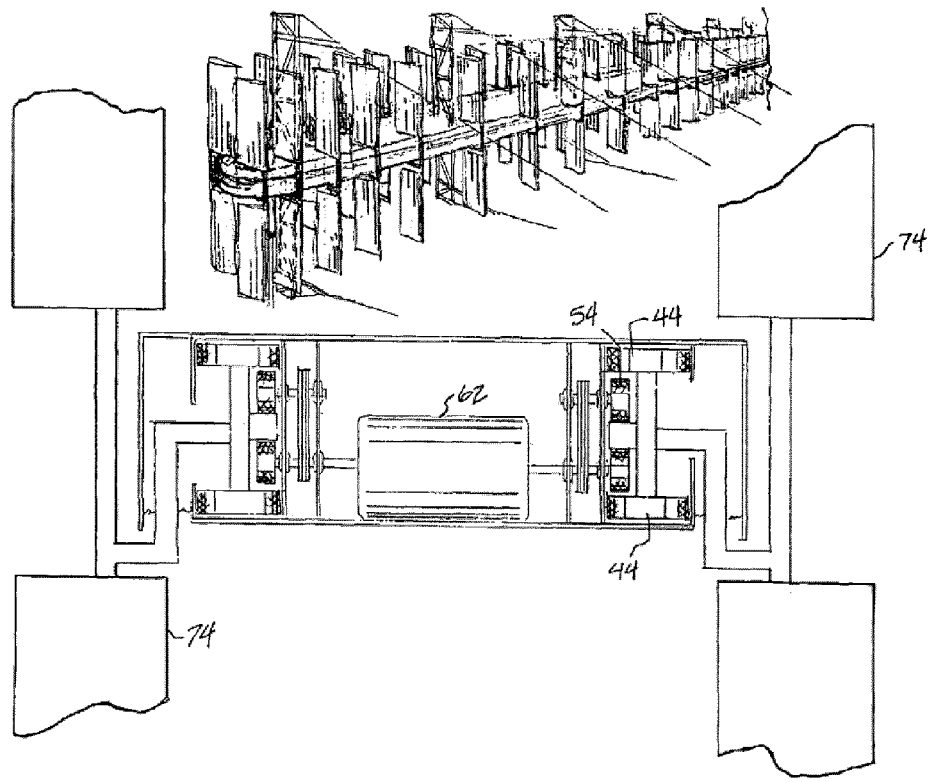
FIG. 2 is a 3-dimensional representation of a Wind and Water Power Generation Device (WWPGD) using a Rail System of the prior art.
Figure 3:
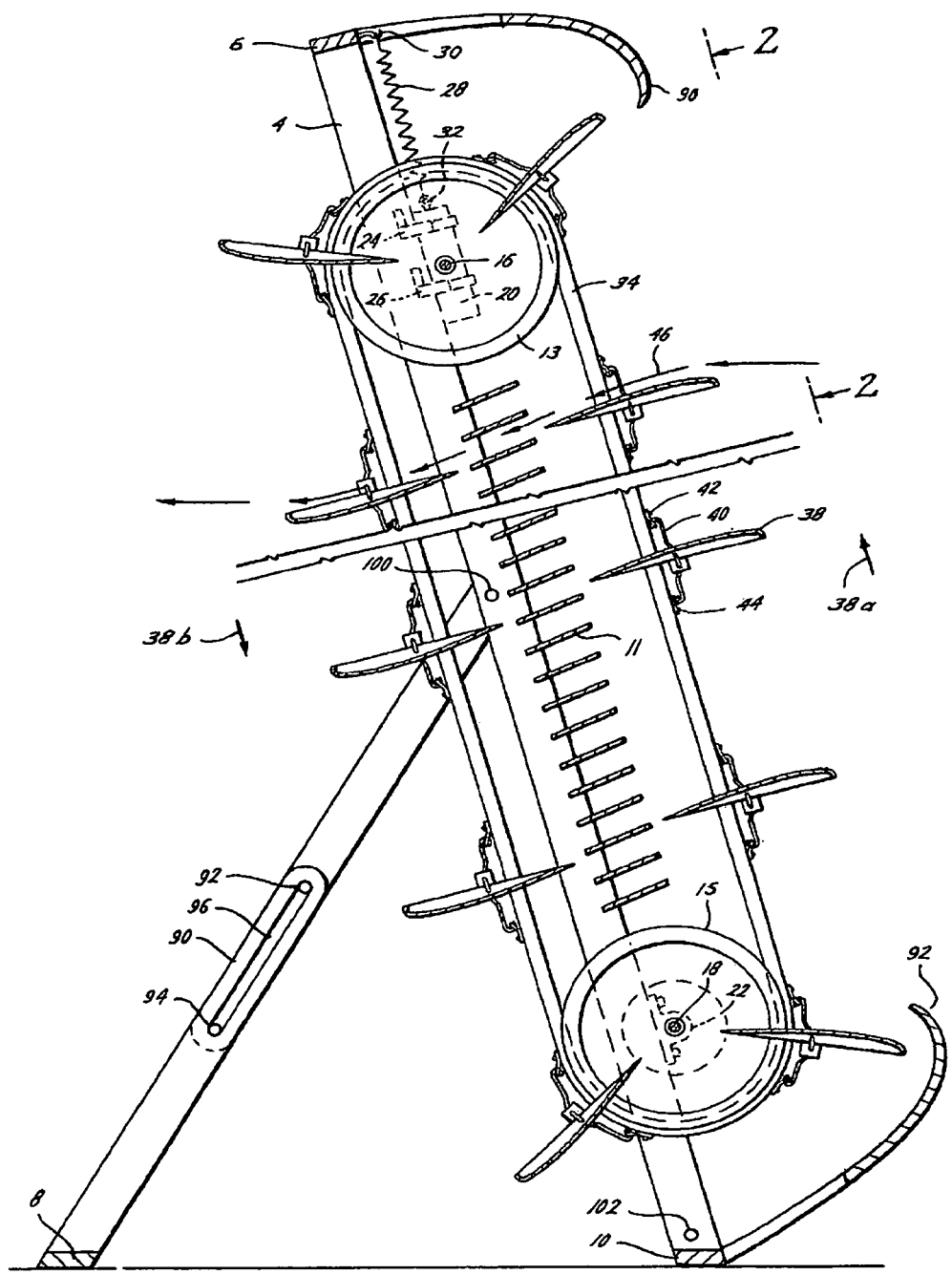
FIG. 3 is a 2-dimensional representation of a Fluid Driven Power Producing Apparatus (FDPPA) of the prior art.
Figure 4:
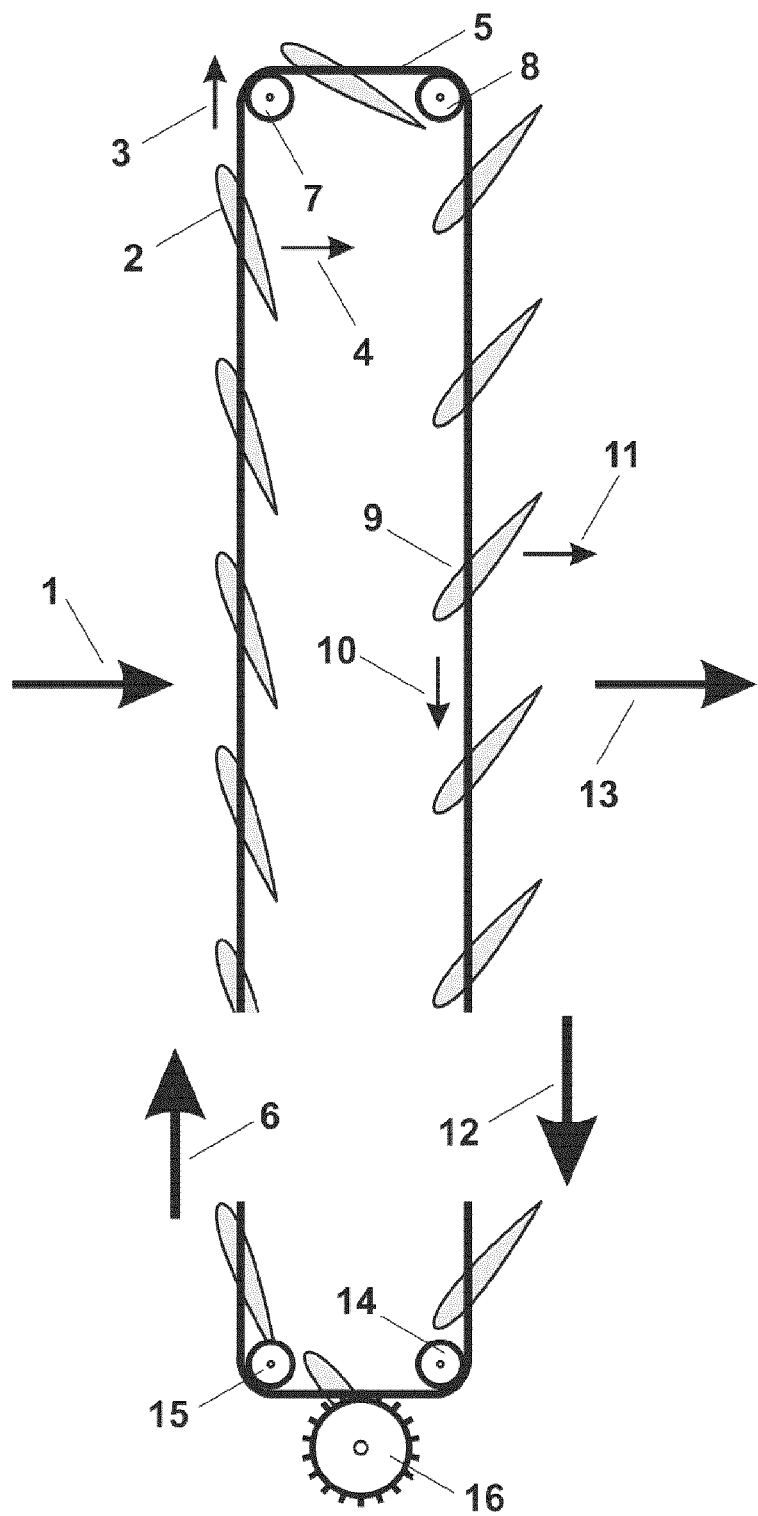
FIG. 4 is a side view of a Multiple Blade Wind Turbine (MBWT) according to an embodiment of the present invention.

FIG. 4 is a side view of an embodiment of the MBWT rotor design using symmetric NACA0015 airfoils with 1.2 chord length spacing. The incoming wind 1 slows down as it approaches the Column 1 airfoils 2 and either passes through the space between the parallel, adjacent airfoils, or flows around the sides of the Column 1 airfoils. As the wind flows around an individual airfoil 2, upward lift 3 is generated as well as horizontal thrust 4. Every airfoil 2 is connected to the rotor's drive chain 5 and so the upward lift 3 generated by each airfoil makes the Column 1 airfoils move vertically upwards 6. The drive chain 5 is guided by a top front sprocket 7 and a top rear sprocket 8. As the wind passes through the Column 2 airfoils 9, downward lift 10 is generated and horizontal thrust 11. The downward lift generated makes the Column 2 airfoils move vertically downwards 12, and the wind 13 then exits past the Column 2 airfoils. The bottom rear sprocket 14 and the bottom front sprocket 15 guide the drive chain 5 to pass over the main drive gear 16, which is connected via a gearbox or hydraulic transmission to an electric generator (not shown). After moving horizontally between the two bottom sprockets 14 and 15, each airfoil rotates on its span-wise axis before it begins its upward vertical movement.

FIG. 5 is a front view of an embodiment of the MBWT system. The concrete base 1 directly supports the generator housing 2, which has a service access door 3. The generator platform 4 supports each electric generator 5, which is connected to a gearbox 6, or hydraulic transmission. The end of each gearbox axle 7 has a gear that meshes with the horizontal, annular gear assembly 8, which also meshes with the rotor's main drive gear 9. The bottom front sprocket 10 guides the drive chain as each connected airfoil 14 moves horizontally forwards and then vertically upwards. The large annular support rail 13 guides and supports the lower structural frame 12, which is connected directly to the central structural frame 15. The main tower 11 has central structural supports 16 and an upper structural frame 18. The top front sprocket 17 guides the drive chain as airfoils move vertically upwards and then horizontally backwards. All structural frames 12, 15, 16 and 18 are interconnected and can rotate a full 360 degrees, so that the plane of the entire structural frame is always perpendicular to the predominant wind direction for maximum power production. Full rotation of the MBWT allows the machine to be yawed, with the plane of the entire structural frame being parallel to the wind direction, to substantially reduce potentially destructive wind forces on the machine during high wind, or gusty wind conditions.

Figure 6:
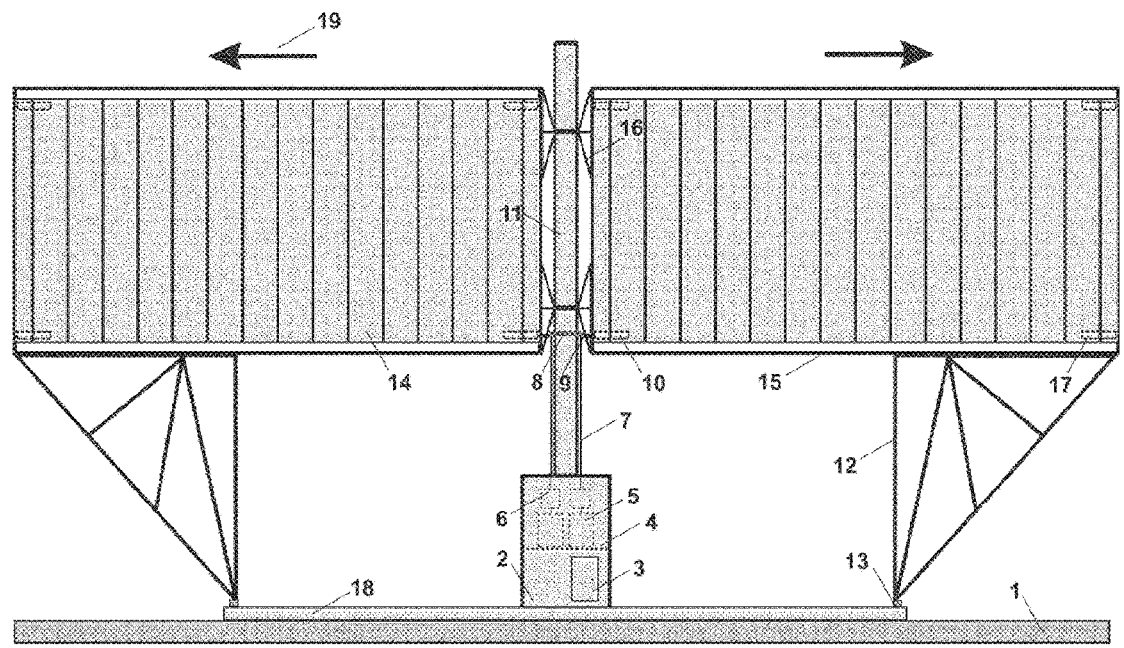
FIG. 6 is a front view of a Horizontal MBWT system using horizontally moving blades according to an embodiment of the present invention.

FIG. 6 is a front view of an embodiment of a Horizontal MBWT system. The concrete base 1 directly supports the generator housing 2, which has a service access door 3. The generator platform 4 supports each electric generator 5, which is connected to a gearbox 6, or hydraulic transmission. The end of each gearbox axle 7 has a gear that meshes with the horizontal, annular gear assembly 8, which also meshes with the rotor's main drive gear 9. The bottom inner front sprocket 10 guides the drive chain as each connected airfoil 14 moves forwards and then horizontally outwards 19. The lower structural frame 12 is supported by a roller system 13, which travels on a large circular metal rail 18. The main structural frame 15 is supported by the lower structural frame 12 and by the central structural supports 16, which are attached directly to the main tower 11. The top outer front sprocket 17 guides the drive chain as airfoils move horizontally outwards and then backwards. All structural frames 12, 15, and 16 are interconnected and can rotate a full 360 degrees, so that the plane of these frames is always perpendicular to the predominant wind direction during power production. Full rotation of the MBWT allows the machine to be yawed, with the plane of the structural frame being parallel to the wind direction, to substantially reduce potentially destructive wind forces on the machine during high wind, or gusty wind conditions. Another version of the Horizontal MBWT system, where the airfoils move in an extended horizontal trajectory between two or more support towers, is also possible.

Figure 7:
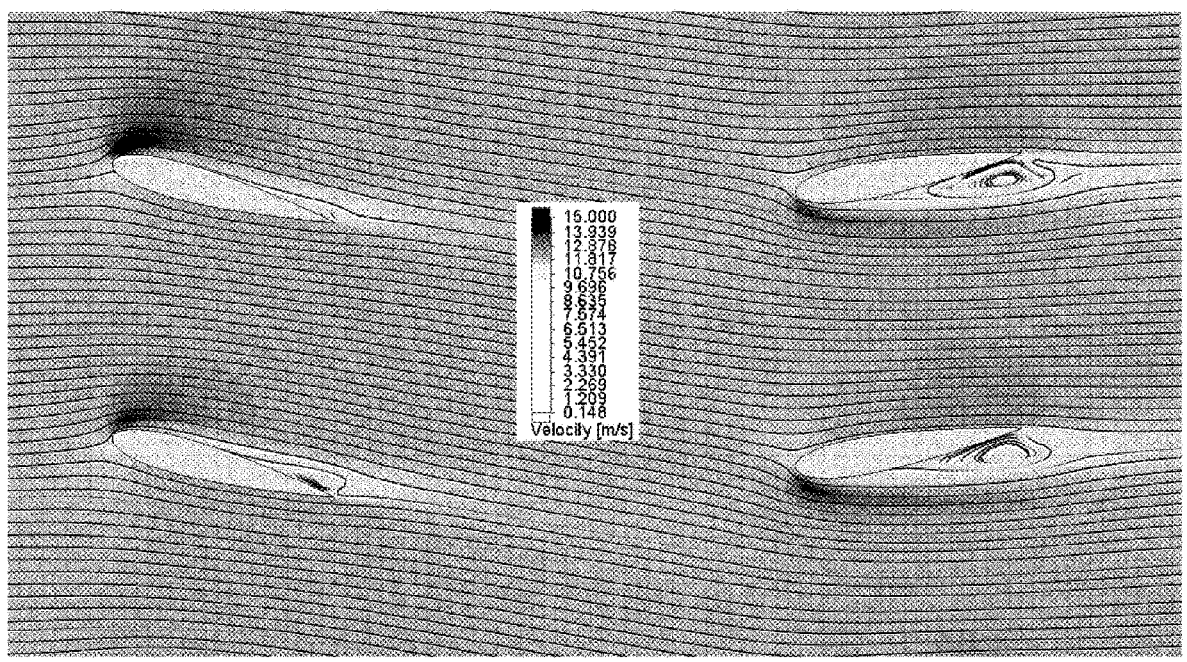
FIG. 7 is a side view of an MBWT rotor using NACA0016 airfoils with both columns in a Computational Fluid Dynamics (CFD) analysis showing velocity contours and stream lines.

FIG. 7 is a SolidWorks® computational fluid dynamics (CFD) analysis of air flowing (from left to right) through the rotor's two columns of airfoils using the NACA0016 airfoil profile. The Column 1 (windward) airfoils have a pitch (i.e. slope) of 15 degrees (from horizontal) and are spaced 1.2 chord lengths apart. The Column 2 (leeward) airfoils have the same inter-foil spacing and have a pitch of −10 degrees. The horizontal distance between the trailing edges of the airfoils in each column is 3.0 chord lengths. The wind has an air speed of 10 m/s horizontal and 0 m/s vertical to simulate the air flow through the two columns of airfoils when the MBWT is just starting up. In Column 1, as the wind flows over the top surface of each airfoil, the air speed increases from 10 m/s to a maximum of 15 m/s. According to the Bernoulli principle this speed increase is due to the internal energy of the air being converted to additional kinetic energy with a corresponding drop in air pressure. This pressure drop results in the generation of a significant upward force (i.e.

lift) for the Column 1 airfoils. In Column 2, as the wind flows over the lower surface of each airfoil, the air speed increases from 10 m/s to a maximum of 15 m/s. The resulting pressure drop generates a significant downward force, which is referred to as "downlift", for the Column 2 airfoils.

FIG. 8a is a SolidWorks® computational fluid dynamics (CFD) analysis of air flowing (from left to right) through the rotor's first column of airfoils using the NACA0016 airfoil profile. The Column 1 (windward) airfoils have a pitch of 70 degrees (from horizontal) and are spaced 1.2 chord lengths apart. The wind has an air speed of 10 m/s horizontal, and 20 m/s vertical to emulate the Column 1 airfoils moving upwards at a linear speed of 20 m/s. Due to the physical obstruction of the closely-spaced airfoils, the wind speed is reduced to approximately 8 m/s directly in front of the airfoils. Therefore, the airfoils experience a relative wind of 21.5 m/s with a direction of −68.2 degrees. In Column 1, as the wind is funneled between two adjacent airfoils the air speed increases substantially to a maximum of 35.0 m/s. According to the Bernoulli principle this speed increase is due to the internal energy of the air being converted to additional kinetic energy with a corresponding drop in air pressure. This pressure drop results in the generation of significant upward lift for the Column 1 airfoils.

In FIG. 8b, the Column 2 (leeward) airfoils have the same inter-foil spacing and have a pitch of −70 degrees. The horizontal distance between the trailing edges of the airfoils in each column is 3.0 chord lengths. Just in front of the Column 2 airfoils, the wind has a slightly lower air speed of 7 m/s horizontal, and −20 m/s vertical to emulate the Column 2 airfoils moving downwards at a linear speed of 20 m/s. The airfoils experience a relative wind of 21.2 m/s with a direction of 70.7 degrees. As the wind is funneled between two adjacent airfoils in Column 2 the air speed increases substantially to a maximum of approximately 30.0 m/s along the lower surface of each airfoil. This increase in air speed results in a corresponding pressure drop, which generates significant downlift for the Column 2 airfoils.

FIG. 9a is a SolidWorks® computational fluid dynamics (CFD) analysis of air pressure around the rotor's first column of airfoils using the NACA0016 airfoil profile. The configuration of these airfoils is identical to FIG. 8a, as well as the wind speed. The air pressure contours clearly indicate a high pressure area (up to 101,640 Pa) on the windward side of the airfoils and a lower pressure area (down to 100,766 Pa) on the leeward side of the airfoils. This pressure difference of 874 Pa generates upward lift for the Column 1 airfoils. It also generates a thrust force on the airfoils in the direction of the wind (from left to right).

FIG. 9b is a SolidWorks® computational fluid dynamics (CFD) analysis of air pressure around the rotor's second column of airfoils using the NACA0016 airfoil profile. The configuration of these airfoils is identical to FIG. 8b, including the wind speed. The air pressure contours indicate a high pressure area (up to 101,630 Pa) on the windward side of the airfoils and a lower pressure area (down to 100,846 Pa) on the leeward side of the airfoils. This pressure difference of 784 Pa generates downlift for the Column 2 airfoils. It also generates a thrust force on these airfoils in the direction of the wind (from left to right).

Figures 10A, 10B:
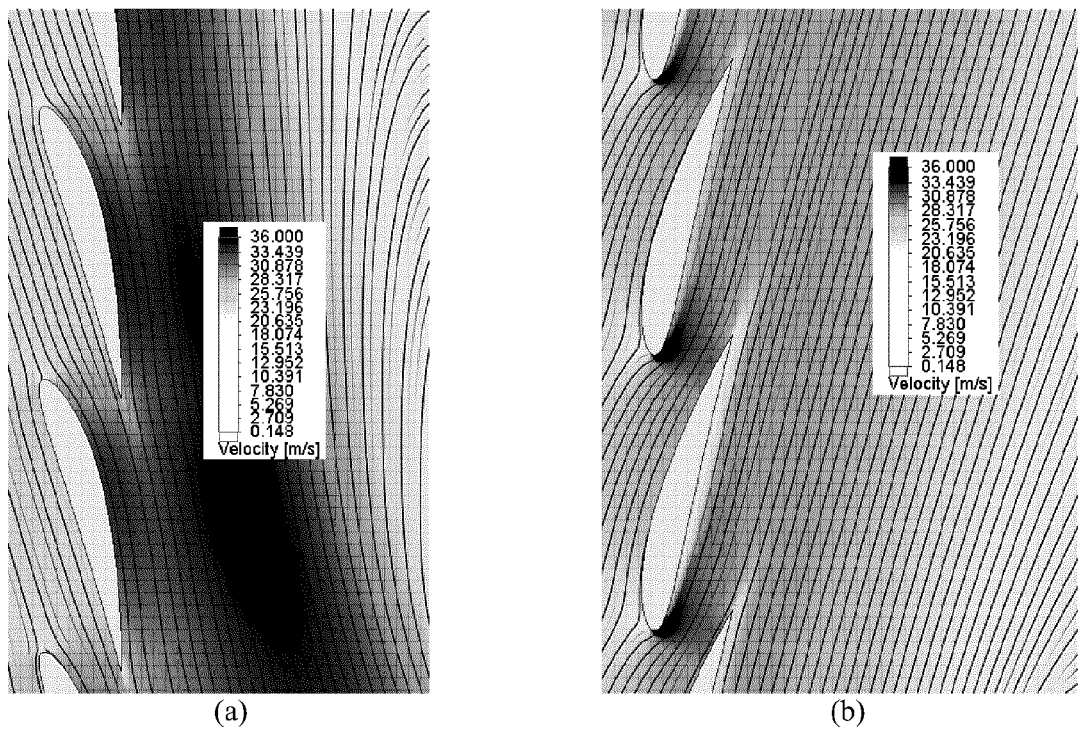
FIG. 10a is a side view of an MBWT rotor's first column (windward) moving upwards using asymmetrical NACA4412 airfoils in a CFD analysis showing velocity contours and stream lines.
FIG. 10b is a side view of an MBWT rotor's second column (leeward) moving downwards using NACA4412 airfoils in a CFD analysis showing velocity contours and stream lines.

FIG. 10a is a SolidWorks® computational fluid dynamics (CFD) air velocity contour diagram of air flowing (from left to right) through the rotor's first column of airfoils using the NACA4412 airfoil profile. The Column 1 (windward) airfoils have a pitch of 75 degrees (from horizontal) and are spaced 0.9 chord lengths apart. The wind has an air speed of 10 m/s horizontal, and −20 m/s vertical to emulate the Column 1 airfoils moving upwards at a linear speed of 20 m/s. Due to the physical obstruction of the closely-spaced airfoils, the wind speed is reduced to approximately 5.5 m/s directly in front of the airfoils. Therefore, the airfoils experience a relative wind of 20.7 m/s with a direction of −74.6 degrees. In Column 1, as the wind is funneled between two adjacent airfoils the air speed increases substantially to a maximum of 36.0 m/s. This increase in speed is due to the internal energy of the air being converted to additional kinetic energy with a corresponding drop in air pressure. This pressure drop results in the generation of significant upward lift for the Column 1 airfoils.

FIG. 10b is a SolidWorks® computational fluid dynamics (CFD) air velocity contour diagram of air flowing (from left to right) through the rotor's second column of airfoils using the NACA4412 airfoil profile. The Column 2 (leeward) airfoils have a pitch of 75 degrees (from horizontal) and are spaced 0.9 chord lengths apart. The wind has an air speed of 10 m/s horizontal, and 20 m/s vertical to emulate downward movement at a linear speed of 20 m/s. Due to the physical obstruction of the closely-spaced airfoils, the wind speed is reduced to approximately 6.3 m/s directly in front of the airfoils. Therefore, the airfoils experience a relative wind of 21.0 m/s with a direction of 72.5 degrees. Despite the higher-cambered surface of the airfoil facing the windward side, each airfoil still generates downlift, since the maximum air speed occurs along the bottom leeward side of the airfoil. The higher-cambered surface of each airfoil faces the windward side after each airfoil is rotated counter-clockwise by 150 degrees as it transitions from a Column 1 to a Column 2 airfoil.

Figure 11:
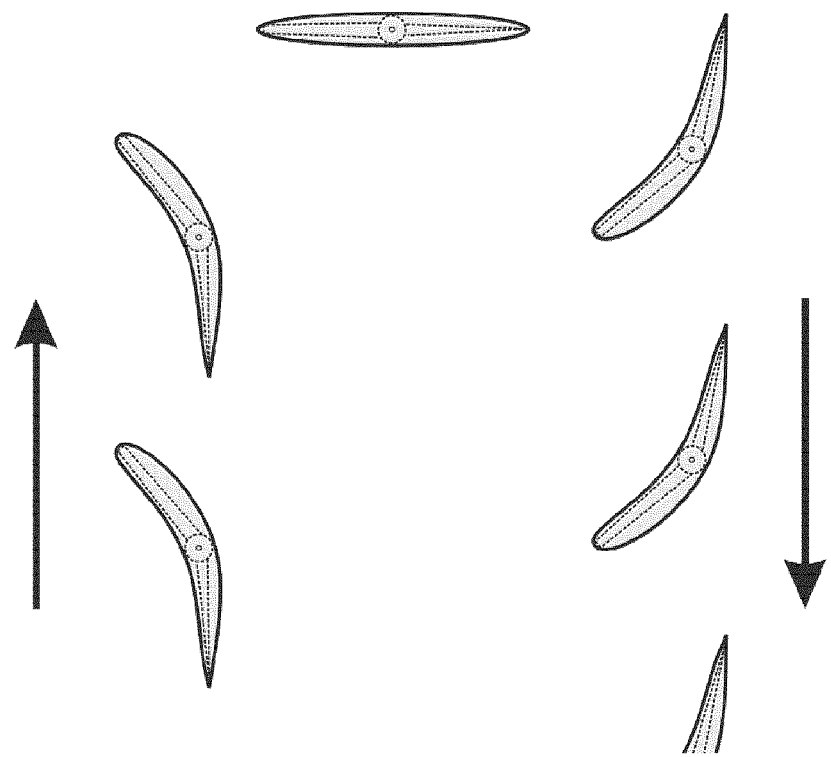
FIG. 11 is a side view of an MBWT rotor using flexible GOE531 airfoils with the second column of airfoils in a flipped orientation according to an embodiment of the present invention.

FIG. 11 is a side view of a rotor using high-camber GOE531 airfoils with the second column of airfoils in a flipped orientation. Making the airfoils capable of being flipped would significantly increase the downlift generated by the second column. Airfoils with this capability would probably be made of flexible material, or be used in an internal articulating frame that is covered with a flexible skin. The Column 1 airfoils have a pitch of 70 degrees (from horizontal) and are spaced 1.2 chord lengths apart. The Column 2 airfoils have the same inter-foil spacing and have a pitch of −60 degrees. The horizontal distance between the trailing edges of the airfoils in each column is 2.0 chord lengths.

Figure 12:
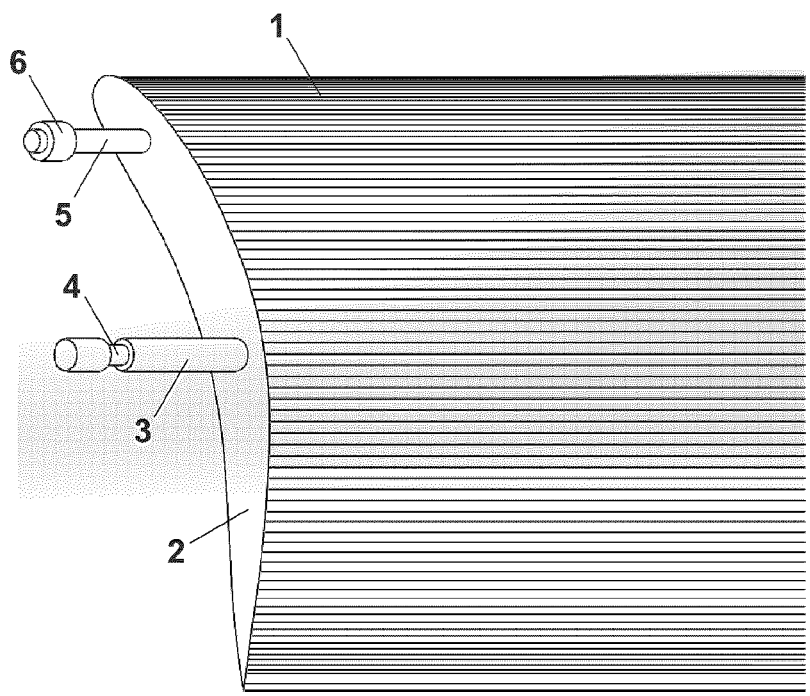
FIG. 12 is a 3-dimensional view of a single GOE531 airfoil that has a central axle for attachment to the drive chain and a shorter column near the leading edge, which is a guide pin according to an embodiment of the present invention.

FIG. 12 is a 3-dimensional end view of a GOE531 airfoil rotor blade 1. The end of this blade 2 incorporates two columnar protrusions. The central column with the greater diameter is the airfoil's drive axle 3. The drive axle incorporates a narrow shaft section 4 that fits into a circular bearing, which is part of a modified drive chain link. The drive axle allows the airfoil 1 to be axially rotated and also translates the lift force from the airfoil directly to the drive chain. The smaller column near the airfoil's leading edge is the guide pin assembly 5. A roller 6 is attached to the end of the guide pin. The guide pin assembly fits into a guide channel to control the airfoil's pitch. The guide channel is located between the edge 2 of each airfoil and the drive chain mechanism. The guide channel is connected to the structural frame of the MBWT and is movable in real-time to optimize an airfoil's pitch. Clearly, other mechanical methods could be employed to accurately control each airfoil's pitch angle.

Figure 13:
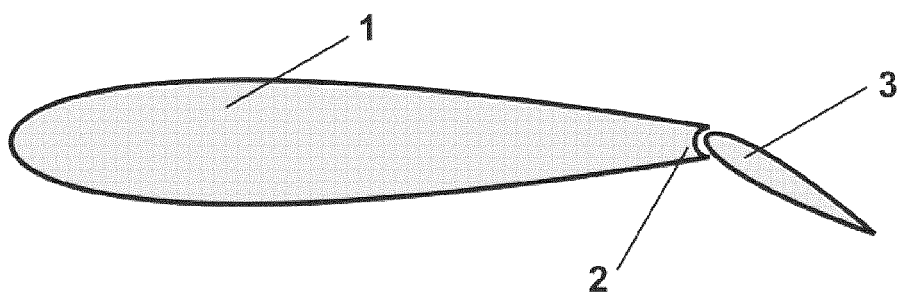
FIG. 13 is a side view of a NACA0016 airfoil modified with a hinged flap section according to an embodiment of the present invention.

FIG. 13 is a side view of a rotor's NACA0016 airfoil modified with a plain flap section. The trailing edge of the airfoil 1 has a movable hinge 2 that is attached to a flap 3. This flap can be moved to adjust the direction of the airflow past the airfoil to increase lift. A similar configuration could be used with other types of airfoils. Other types of flaps, such as a split flap, a single-slotted flap or a double-slotted flap could also be used.

Figure 14:
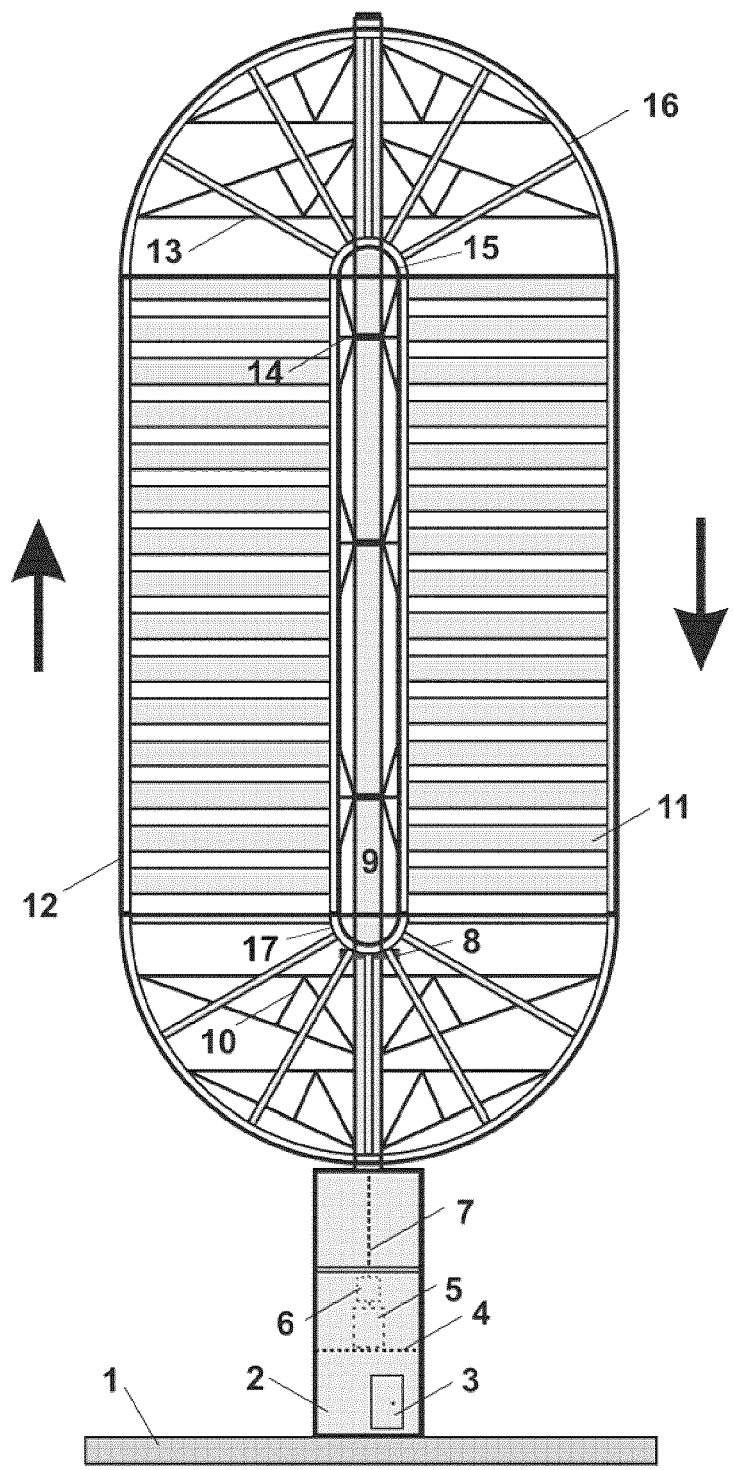
FIG. 14 is a front view of a Single Rotor MBWT system that comprises two oval tracks with one track inside and concentric to the other, with the tracks in front of the central support tower and with the oval tracks in a vertical orientation according to an embodiment of the present invention.

FIG. 14 is a front view of an embodiment of a Single Rotor MBWT system. The arrows indicate the direction in which the airfoils travel. The concrete base 1 directly supports the generator housing 2, which has a service access door 3. The generator platform 4 supports an electric generator 5, which is connected to a gearbox 6, or hydraulic transmission. The end of the gearbox axle 7 has a gear that meshes with the horizontal, annular gear assembly 8, which contains a sprocket that meshes with the rotor's inner drive chain 17. The inner drive chain 17 is connected to each airfoil 11, which moves in a vertically oval trajectory. The outer drive track 16 guides and supports the outside end of each airfoil 11. The outer oval structural frame 12 is connected to the main tower 9 by the lower structural supports 10 and the upper structural supports 13. The inner oval structural frame 15 is connected to the main tower 9 by the inner structural supports 14. Both the outer oval structural frame 12 and the inner oval structural frame 15 can rotate a full 360 degrees, so that the plane of the entire structural frame is always perpendicular to the predominant wind direction for maximum power production. Full rotation of the Single Rotor MBWT allows the machine to be yawed, with the plane of the entire structural frame being parallel to the wind direction, to substantially reduce potentially destructive wind forces on the machine during high wind, or gusty wind conditions. A horizontal version of the Single Rotor MBWT system where the airfoils move in a horizontal oval trajectory, or move in an extended horizontal oval trajectory between two or more support towers, is also possible, as is shown in FIG. 16.

Figure 15:
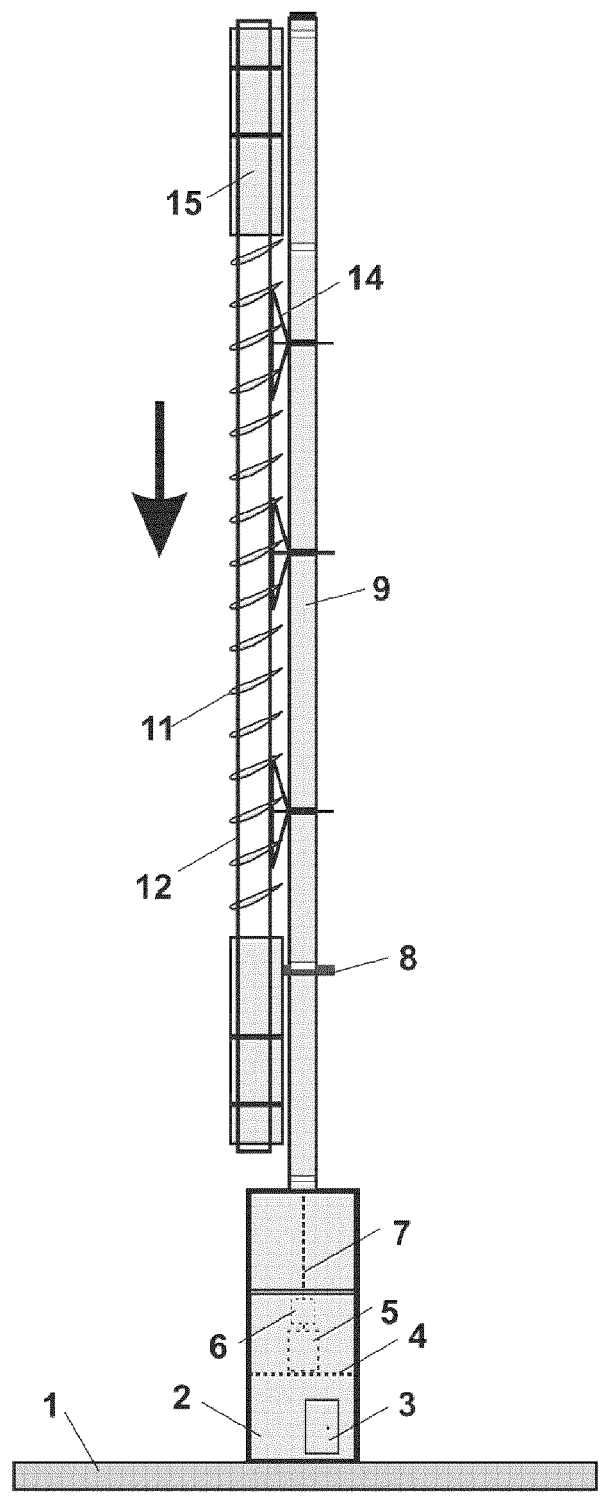
FIG. 15 is a side view of a Single Rotor MBWT system that comprises two oval tracks with one track inside and concentric to the other, with the tracks in front of the central support tower and with the oval tracks in a vertical orientation according to an embodiment of the present invention.

FIG. 15 is a side view of an embodiment of a Single Rotor MBWT system. The concrete base 1 directly supports the generator housing 2, which has a service access door 3. The generator platform 4 supports an electric generator 5, which is connected to a gearbox 6, or hydraulic transmission. The end of the gearbox axle 7 has a gear that meshes with the horizontal, annular gear assembly 8. The outer oval structural frame 12 is connected to the main tower 9 by the lower structural supports and the upper structural supports 14. This right-side view shows an airfoil 11 moving downwards, as indicated by the arrow, due to the downlift generated by the wind. An airfoil 15 near the top of the tower moves in an arc-shaped trajectory, when the MBWT is viewed from the front, before it starts moving vertically downwards.

Figure 16:
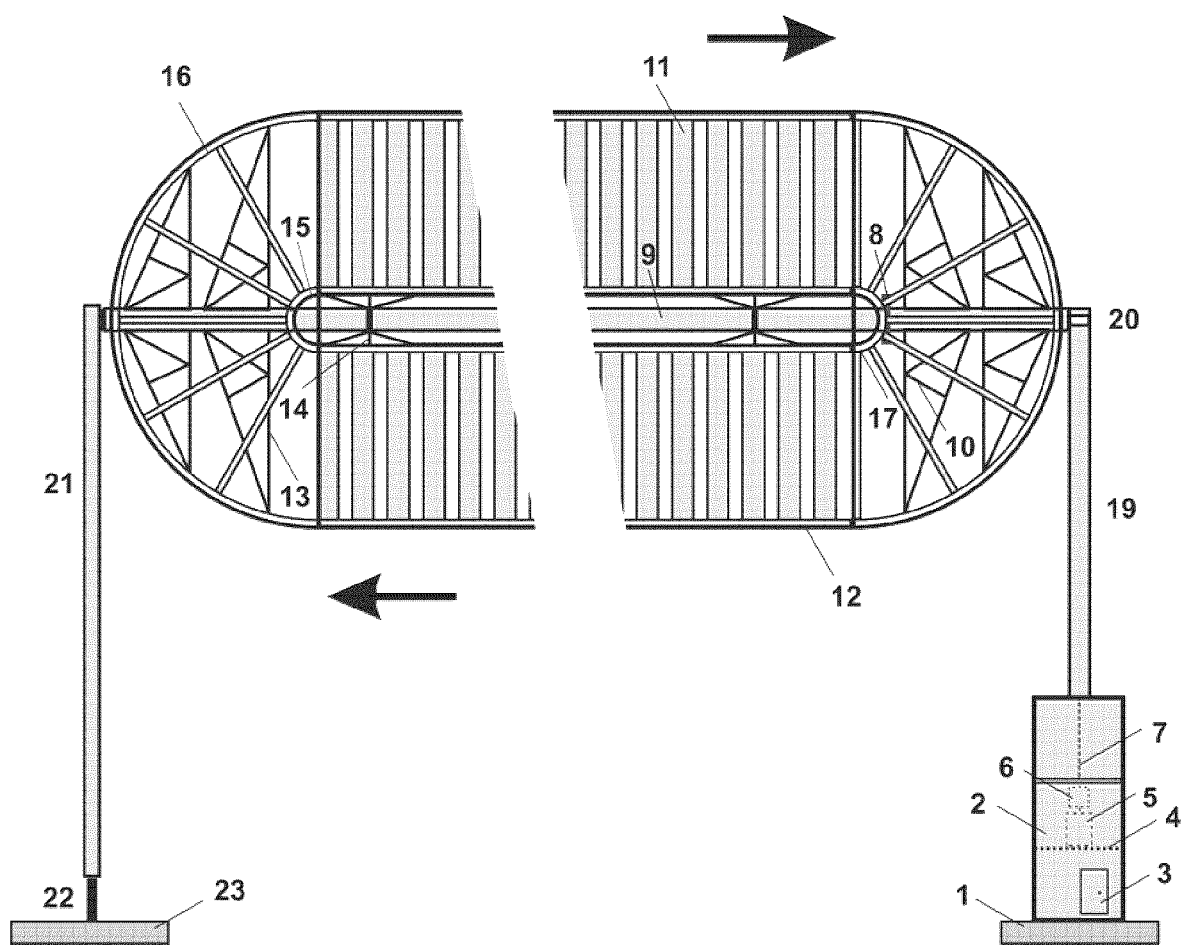
FIG. 16 is a front view of a Single Rotor Horizontal MBWT system that comprises two oval tracks with one track inside and concentric to the other, with the tracks in front of the two support towers and with the oval tracks in a horizontal orientation according to an embodiment of the present invention.

FIG. 16 is a front view of an embodiment of a Single Rotor Horizontal MBWT system. The arrows indicate the direction in which the airfoils travel. The concrete base 1 directly supports the generator housing 2, which has a service access door 3. The generator platform 4 supports an electric generator 5, which is connected to a gearbox 6, or hydraulic transmission. The end of the gearbox axle 7 has a linkage through the upper tower 19 that connects to the horizontal, annular gear assembly 8, which contains a sprocket that meshes with the rotor's inner drive chain 17. The inner drive chain 17 is connected to each airfoil 11, which moves in a horizontal, oval trajectory. The outer drive track 16 guides and supports the outside end of each airfoil 11. The outer oval structural frame 12 is connected to the main tower 9 by the base structural supports 10 and the perimeter structural supports 13. The inner oval structural frame 15 is connected to the main tower 9 by the inner structural supports 14. The horizontal rotor assembly is connected to the upper tower 19 by a gear mechanism 20 that allows the rotor to rotate a full 360 degrees. This rotation is achieved by moving the perimeter tower 21 in a circular path by means of a tracking system 22 that is supported by a solid base 23. Rotating the Horizontal MBWT system permits both maximum power production when its plane is perpendicular to the predominant wind direction, and yawing out of the wind to minimize potentially destructive wind forces during high wind conditions.

Figure 17:
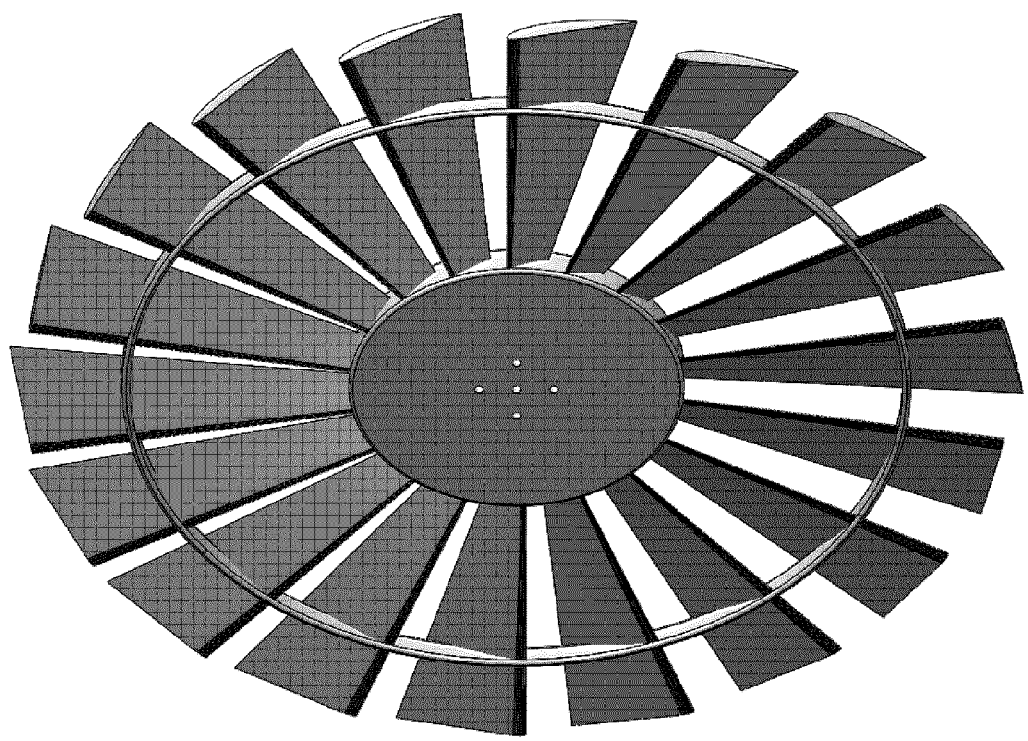
FIG. 17 is a Horizontal Axis Wind Turbine (HAWT) rotor with 18 closely-spaced NACA4412 airfoils, which incorporates an annular blade support according to an embodiment of the present invention.

FIG. 17 is an 18-blade rotor with closely-spaced NACA4412 airfoils. For additional strength, a structural hoop reduces blade vibration and ensures that the airfoils are kept apart by a constant chord-length distance (i.e., 1 to 4 chord lengths). The blades are twist and tapered with the thickest part of the blade at the perimeter. At the perimeter, the blades when stationary have a pitch of about 80 degrees (plus 10 or minus 20 degrees) against the ambient wind direction. This rotor has very high starting torque. Unlike the similar-looking American Midwestern farm windmill, this rotor uses rigid airfoils instead of curved blades and has a higher aerodynamic efficiency.

The present MBWT is relatively inexpensive to manufacture. In addition, computational fluid dynamic (CFD) analyses indicate that it has a higher power density, in terms of kilowatts/(swept area in $m^2$), than an industry-standard horizontal axis wind turbine (HAWT) when the linear velocity of the rotor's chain drive is equal to or greater than 60% of the ambient wind speed.

Although preferred embodiments of the invention have been described herein in detail, it will be understood that those skilled in the art can make modifications thereto without departing from the spirit of the invention or the scope of the appended claims.

What is claimed is:

1. A multiple blade wind turbine comprising:
at least one rotor comprising a set of closed loop tracks arranged in a single plane with respect to an airflow direction;
a plurality of airfoils interspaced within the set of closed loop tracks, wherein the set of closed loop tracks is oval;
wherein each of the plurality of airfoils have a leading edge, a trailing edge, a pressure side, a suction side, a chord length, and a span length;
wherein each of the plurality of airfoils is connected at each end to one of the set of closed loop tracks, where the leading edge and trailing edge are parallel to the single plane, and each of the plurality of airfoils are fully rotatable with respect to the single plane;
wherein the plane of the set of closed loop tracks is perpendicular to the airflow;
wherein each of the plurality of airfoils have a pitch angle between 15 and 90 degrees;
wherein each of the plurality of airfoils are spaced between 0.3 and 6.0 chord lengths apart;
a transmission mechanically coupled to the set of closed loop tracks, wherein the set of closed loop tracks drives the transmission; and
an electric generator connected to the transmission.

2. The multiple blade wind turbine of claim 1, further comprising:
a central support tower, wherein the central support tower is coupled to the at least one rotor.

3. The multiple blade wind turbine of claim 2,
wherein the at least one rotor is positioned in front of a central axis of the central support tower.

4. The multiple blade wind turbine of claim 2,
wherein the at least one rotor is maintained parallel to the central support tower.

5. The multiple blade wind turbine of claim 2,
wherein the central support tower is configured to support the at least one rotor.

6. The multiple blade wind turbine of claim 1, the transmission further comprising:
an adjustable-speed drive, a continuously variable transmission, or a hydraulic transmission.

7. The multiple blade wind turbine of claim 1, further comprising:
a generator housing that contains the electric generator and the transmission.

8. The multiple blade wind turbine of claim 1,
wherein the set of closed loop tracks comprises a set of drive belts or a set of drive chains.

9. The multiple blade wind turbine of claim 1, the transmission further comprising:
a gear box;
a gear assembly;
a gearbox axle;
wherein the gear assembly contains a sprocket which is coupled to a set of closed loop tracks;
wherein the gear assembly is connected to the gearbox axle;
wherein the gearbox axle is coupled to the gearbox;
wherein the gearbox is coupled to the electric generator.

10. A multiple blade wind turbine comprising:
at least one rotor comprising a set of closed loop tracks arranged in a single plane with respect to an airflow direction;
a plurality of airfoils interspaced within the set of closed loop tracks, wherein the set of closed loop tracks is oval,
wherein each of the plurality of airfoils have a leading edge, a trailing edge, a pressure side, a suction side, a chord length, and a span length;
wherein each of the plurality of airfoils is connected at each end to one of the set of closed loop tracks, where the leading edge and trailing edge are parallel to the single plane, and each of the plurality of airfoils are fully rotatable with respect to the single plane;
wherein the plane of the set of closed loop tracks is perpendicular to the airflow;
wherein each of the plurality of airfoils have a pitch angle between 15 and 90 degrees;
wherein each of the plurality of airfoils are spaced between 0.3 and 6.0 chord lengths apart;
a central support tower, wherein the central support tower is coupled to the at least one rotor;
a transmission mechanically coupled to the set of closed loop tracks, wherein the set of closed loop tracks drives the transmission;
an electric generator connected to the transmission; and
a generator housing that contains the electric generator and the transmission.

11. The multiple blade wind turbine of claim 10, the transmission further comprising:
an adjustable-speed drive, a continuously variable transmission, or a hydraulic transmission.

12. The multiple blade wind turbine of claim 10,
wherein the at least one rotor is positioned in front of a central axis of the central support tower.

13. The multiple blade wind turbine of claim 12,
wherein the at least one rotor is maintained parallel to the central support tower.

14. The multiple blade wind turbine of claim 12,
wherein the central support tower is configured to support the at least one rotor.

15. The multiple blade wind turbine of claim 12,
wherein the central support tower maintains the rotor in a fixed orientation with respect to the central support tower.

16. The multiple blade wind turbine of claim 10, the transmission further comprising:
a gear box;
a gear assembly;
a gearbox axle;
wherein the gear assembly contains a sprocket which is coupled to a set of closed loop tracks;
wherein the gear assembly is connected to the gearbox axle;
wherein the gearbox axle is coupled to the gearbox;
wherein the gearbox is coupled to the electric generator.

17. The multiple blade wind turbine of claim 10,
wherein the set of closed loop tracks comprises a set of drive belts or a set of drive chains.

18. A multiple blade wind turbine comprising:
at least one rotor comprising a set of closed loop tracks arranged in a single plane with respect to an airflow direction;
a plurality of airfoils interspaced within the set of closed loop tracks, wherein the set of closed loop tracks is oval,
wherein each of the plurality of airfoils have a leading edge, a trailing edge, a pressure side, a suction side, a chord length, and a span length;
wherein each of the plurality of airfoils is connected at each end to one of the set of closed loop tracks, where the leading edge and trailing edge are parallel to the single plane, and each of the plurality of airfoils are fully rotatable with respect to the single plane;
wherein the plane of the set of closed loop tracks is perpendicular to the airflow;
wherein the set of closed loop tracks comprises a set of drive belts or a set of drive chains;
wherein each of the plurality of airfoils have a pitch angle between 15 and 90 degrees;
wherein each of the plurality of airfoils are spaced between 0.3 and 6.0 chord lengths apart;
a central support tower, wherein the central support tower is coupled to the at least one rotor;
wherein the at least one rotor is positioned in front of a central axis of the central support tower;
wherein the at least one rotor is maintained parallel to the central support tower;
wherein the central support tower is configured to support the at least one rotor;
a transmission mechanically coupled to the set of closed loop tracks, wherein the set of closed loop tracks drives the transmission;
an electric generator connected to the transmission; and
wherein the transmission is either an adjustable-speed drive, a continuously variable transmission, or a hydraulic transmission;
wherein the transmission comprises
a gear box;
a gear assembly;

a gearbox axle;
> wherein the gear assembly contains a sprocket which is coupled to a set of closed loop tracks;
> wherein the gear assembly is connected to the gearbox axle;
> wherein the gearbox axle is coupled to the gearbox;
> wherein the gearbox is coupled to the electric generator;

a generator housing that contains the electric generator and the transmission.

\* \* \* \* \*